A. O. BUCKIUS, Jr.
TRUCK SIDE FRAME.
APPLICATION FILED AUG. 28, 1909.

958,474.

Patented May 17, 1910.
2 SHEETS—SHEET 1.

WITNESSES
Walter Tamariss
J. B. Bluming

INVENTOR
A. O. Buckius Jr.
by Bakewell, Byrnes & Parmelee,
his Attys.

A. O. BUCKIUS, Jr.
TRUCK SIDE FRAME.
APPLICATION FILED AUG. 28, 1909.

958,474.

Patented May 17, 1910.
2 SHEETS—SHEET 2.

WITNESSES

INVENTOR

UNITED STATES PATENT OFFICE.

ALBERT O. BUCKIUS, JR., OF CHICAGO, ILLINOIS, ASSIGNOR TO THE NATIONAL MALLEABLE CASTINGS COMPANY, OF CLEVELAND, OHIO, A CORPORATION OF OHIO.

TRUCK SIDE FRAME.

958,474.      Specification of Letters Patent.      Patented May 17, 1910.

Application filed August 28, 1909. Serial No. 515,028.

*To all whom it may concern:*

Be it known that I, ALBERT O. BUCKIUS, Jr., of Chicago, Cook county, Illinois, have invented a new and useful Improvement in Truck Side Frames, of which the following is a full, clear, and exact description, reference being had to the accompanying drawings, forming part of this specification, in which—

Figure 1:
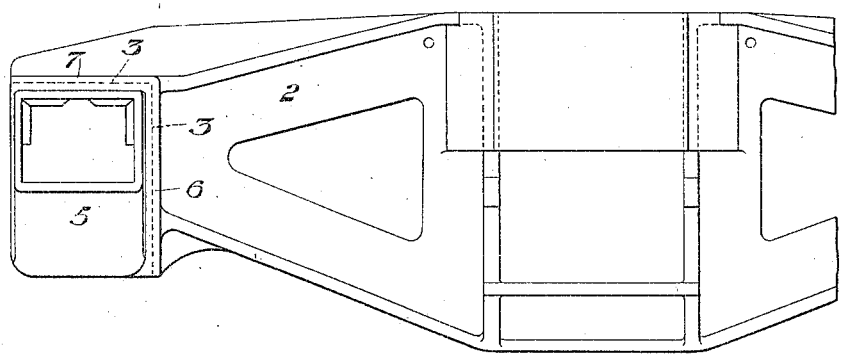
Figure 2:
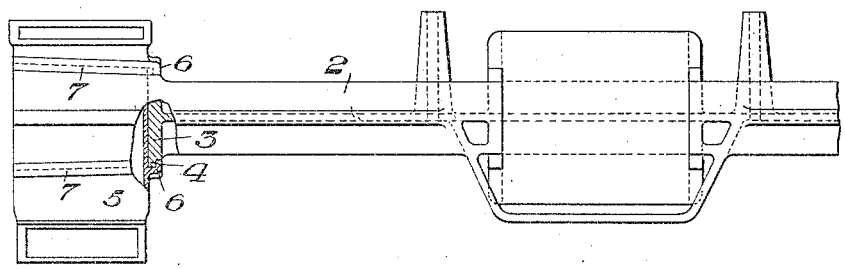
Figure 4:
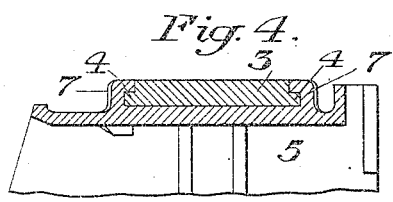
Figure 3:
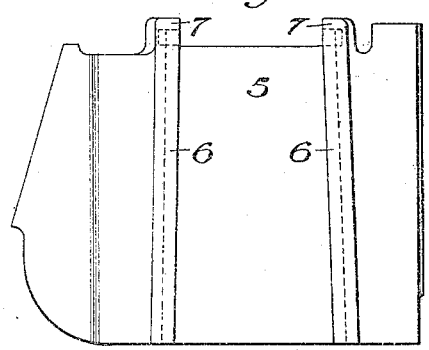
Figure 5:
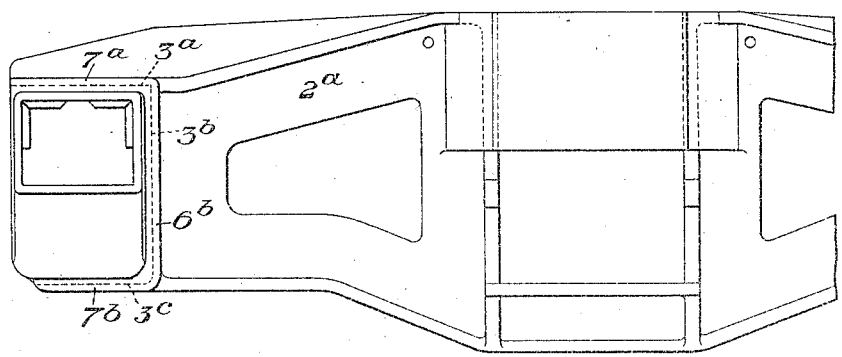
Figure 6:
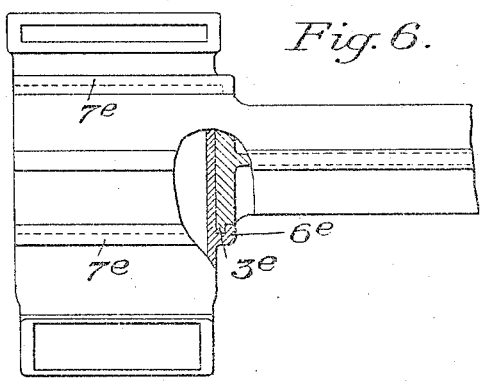
Figure 7:
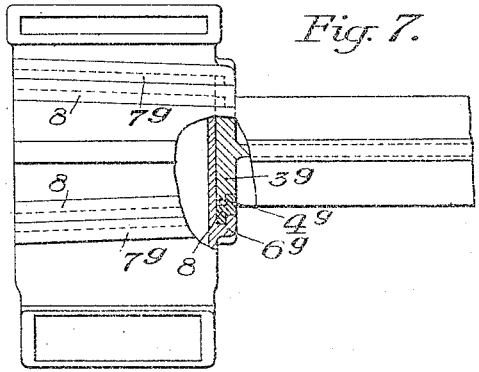

Figure 1 is a front elevation of my improved side frame; Fig. 2 is a top plan view partly in section; Fig. 3 is a side elevation of the journal box which I prefer to use; Fig. 4 is an enlarged detail view showing the preferred form of connection; Fig. 5 is a view similar to Fig. 1 showing a modified form of connection between the truck frame and the journal box, and Figs. 6 and 7 are enlarged views similar to Fig. 2 showing modified forms of connecting the truck frame and journal box.

My invention relates to truck side frames and particularly to the connection of the journal boxes therewith.

The object of the invention is to provide a cheap, simple and improved construction by which the journal boxes may be secured to the side frame.

In the drawing, 2 represents a cast truck frame, shown as in one piece, though any desirable number of parts may be used. This frame may be of any desirable shape and size, as this is not a part of my invention. The end portion of the frame is provided with a partial yoke or strap 3 forming a top and side portion, each of which is provided with projecting edge lips or ribs. The vertical ribs are shown at 4, in Fig. 2, while the horizontal ribs are indicated in Figs. 1 and 2. The yoke walls having these ribs may be either straight sided or tapered from one end toward the other.

The journal box 5, shown in Fig. 3, is provided with straight or converging undercut ribs 6, 6, on one side, and with correspondingly converging undercut ribs 7, on its top. The narrowest portions of the top and side ribs meet at the upper corner, so that as the metal shrinks in cooling, it will draw toward this corner. This corner corresponds to the inner corner of the yoke opening, and as the metal shrinks, it will draw tightly into the converging recesses of the ribs.

In the construction shown in Figs. 1 to 4, I place the journal boxes in a suitable mold, and pour molten metal therein to form the side frame, the molten metal entering the recesses in the converging ribs on the boxes, and when the metal cools the shrinkage of the straps will draw the boxes against the side frame, and rigidly secure it thereto.

In the construction shown in Fig. 5, the journal box is provided with the converging undercut ribs $7^a$ and $7^b$ on the top and bottom thereof, respectively, and with straight undercut ribs $6^b$ on one side, which forms a continuation of the ribs $7^a$ and $7^b$. The frame $2^a$ is cast with a strap or yoke composed of the members $3^a$, $3^b$ and $3^c$, which engage the ribs on box. This order of casting may be reversed by first casting the side frame and placing it in a suitable mold, and then pouring the molten metal therein to form the journal boxes. The ribs $6^e$, $6^e$, and $7^e$, $7^e$, are parallel to each other, and are cast around the straps $3^e$, when the metal is poured into the mold to form the box, as shown in Fig. 6.

In Fig. 7 I have shown still another modification in which the frame and journal boxes are formed separately, the frame having a strap $3^g$ of less width than the strap shown in Figs. 1, 2 and 3. This strap is also provided with ribs $4^g$. The box is provided with converging under cut ribs $6^g$ and $7^g$ similar to the box shown in Figs. 1 to 4.

The boxes are assembled with the frame, given their proper spacing apart and alinement and molding material is then placed outside the ribs of the box on both top and inner side. Metal is then cast into the spaces between the box ribs and the frame lips, as shown at 8, 8. This metal secures the box firmly in place and extends over the top and inner side, and drawing into the undercut ribs more firmly as it shrinks in cooling.

The advantages of my invention will be apparent to those skilled in the art. A boltless side frame may thus be obtained in a simple manner and at small expense. The journal boxes are firmly held in place by the locking metal, and different metals may be employed for the journal boxes and the frame.

Many variations may be made in the form and size of the frame, the shape of the yoke openings, and the journal boxes, without departing from my invention.

I claim:

1. A truck side frame having separately formed journal boxes, recessed ribs in the boxes, the side frame and the journal boxes being secured to each other by cast metal; substantially as described.

2. A truck side frame having a separately formed journal box, one of said members being secured to the other in casting; substantially as described.

3. A truck side frame having separately formed journal boxes, the side frame being secured to the boxes in casting; substantially as described.

4. A truck side frame having separately formed journal boxes, recesses in said boxes, and ribs formed integrally with the frame cast in the recesses to form a cast joint; substantially as described.

5. A truck side frame having separately formed journal boxes, converging recesses in said boxes, and ribs formed integrally with the frame cast in the recesses to form a cast joint; substantially as described.

6. A truck side frame having separately formed journal boxes, recesses in said boxes, ribs on said frame for engaging the recesses in the box, the frame and journal boxes being united by means of a cast joint; substantially as described.

7. The method of making truck side frames having separately formed journal boxes, which consists in first casting one of said members, then placing said member in a mold, and then casting the other member in said mold to form a cast joint between said members; substantially as described.

8. The method of making truck side frames having separately formed journal boxes, which consists in first forming the journal boxes, then placing said boxes in a mold, and then casting the frame in the mold to form a cast joint between the frame and journal boxes; substantially as described.

9. The method of making truck side frames having separately formed journal boxes, which consists in first forming the journal boxes with converging recesses, then placing said boxes in a mold, and then casting the frame in the mold, the cast metal entering the recesses in the boxes to form a cast joint between the frame and journal boxes; substantially as described.

In testimony whereof, I have hereunto set my hand.

ALBERT O. BUCKIUS, Jr.

Witnesses:
C. J. BERGSTROM,
C. E. ROLF.